(12) United States Patent
Sakai et al.

(10) Patent No.: US 9,233,327 B2
(45) Date of Patent: Jan. 12, 2016

(54) FILTER

(71) Applicant: Koganei Corporation, Tokyo (JP)

(72) Inventors: Hiraku Sakai, Tokyo (JP); Makoto Doki, Tokyo (JP)

(73) Assignee: Koganei Corporation, Tokyo (JP)

(*) Notice: Subject to any disclaimer, the term of this patent is extended or adjusted under 35 U.S.C. 154(b) by 59 days.

(21) Appl. No.: 13/690,199

(22) Filed: Nov. 30, 2012

(65) Prior Publication Data

US 2013/0139481 A1 Jun. 6, 2013

(30) Foreign Application Priority Data

Dec. 1, 2011 (JP) .................................. 2011-263454

(51) Int. Cl.
| | | |
|---|---|---|
| *B01D 45/00* | (2006.01) | |
| *B01D 45/16* | (2006.01) | |
| *B04C 5/04* | (2006.01) | |
| *B04C 5/081* | (2006.01) | |
| *B04C 5/181* | (2006.01) | |

(52) U.S. Cl.
CPC . *B01D 45/16* (2013.01); *B04C 5/04* (2013.01); *B04C 5/081* (2013.01); *B04C 5/181* (2013.01)

(58) Field of Classification Search
CPC .......... B01D 45/16; B04C 5/181; B04C 5/04; B04C 5/081
USPC ........... 55/447, 457, 428, 431–433, 423, 429, 55/430, 309
See application file for complete search history.

(56) References Cited

U.S. PATENT DOCUMENTS

| | | | |
|---|---|---|---|
| 1,930,806 A | * | 10/1933 | Horne et al. .................... 55/349 |
| 3,490,209 A | | 1/1970 | Fernandes et al. |
| 3,507,098 A | | 4/1970 | Veres et al. |
| 4,311,494 A | | 1/1982 | Conner et al. |
| 2006/0037172 A1 | * | 2/2006 | Choi ............................ 15/353 |
| 2010/0043365 A1 | | 2/2010 | Fujiyama et al. |
| 2010/0186355 A1 | | 7/2010 | Fujiyama et al. |

FOREIGN PATENT DOCUMENTS

| | | |
|---|---|---|
| CN | 101020164 A | 8/2007 |
| CN | 101143349 A | 3/2008 |

(Continued)

OTHER PUBLICATIONS

Office Action received in Chinese Patent Application 201210497288.9 dated Mar. 10, 2015 and its English Translation.

*Primary Examiner* — Dung H Bui
(74) *Attorney, Agent, or Firm* — McCormick, Paulding & Huber LLP

(57) ABSTRACT

An object of the present invention is to remove foreign matter such as liquid droplets from air with high efficiency using a filter. This filter is used to purify air by removing foreign matter such as liquid droplets and dust from the air. A separation unit is formed with a port block and a separation cylinder, and the port block is formed with a primary port and a secondary port. A collection container is attached to the separation unit, and liquid droplets exhausted from an exhaust port formed at a lower end portion of a separation unit fall down into a collection container. A conical portion of the separation unit is formed with a communication hole through which the separation chamber and the storage chamber communicate with each other, whereby the separation chamber and the storage chamber become equal in pressure to each other.

8 Claims, 16 Drawing Sheets

(56) References Cited

FOREIGN PATENT DOCUMENTS

| | | |
|---|---|---|
| DE | 3624086 A1 | 1/1988 |
| JP | 294388 | 4/1954 |
| JP | 4864566 | 9/1973 |
| JP | 546682 | 1/1979 |
| JP | 61130352 | 8/1986 |
| JP | 6174206 A | 6/1994 |
| JP | 648867 | 7/1994 |
| JP | 7328364 A | 12/1995 |
| JP | 07328364 A | 12/1995 |
| JP | 2002102628 A | 4/2002 |
| JP | 2008018336 A | 1/2008 |
| JP | 2008018337 A | 1/2008 |
| JP | 2010201280 A | 9/2010 |
| JP | 4591856 B1 | 12/2010 |
| JP | 2011051055 B1 | 12/2010 |
| JP | 2011041766 A | 3/2011 |
| JP | 2011083696 A | 4/2011 |

* cited by examiner

FILTER

CROSS-REFERENCE TO RELATED APPLICATION

The present application claims priority from Japanese Patent Application No. 2011-263454 filed on Dec. 1, 2011, the content of which is hereby incorporated by reference into this application.

TECHNICAL FIELD OF THE INVENTION

The present invention relates to a filter which is used to remove foreign matter, such as liquid droplets or dusts, from air to be supplied into a pneumatic device.

BACKGROUND OF THE INVENTION

A pneumatic device, such as a pneumatic cylinder, is supplied with air from a pneumatic source via a pneumatic line such as piping or hose. By connecting the pneumatic source and the pneumatic device via the pneumatic line, a pneumatic circuit is formed. Air to be supplied from the pneumatic source to the pneumatic device is handled as air to be treated, and the pneumatic circuit is provided with a filter for removing foreign matter, such as water droplets or oil droplets or dusts, included in the air to be treated.

As one type of the filter provided in the pneumatic circuit, Japanese Patent Laid-Open Publication No. H07-328364 discloses a filter having a main block, that is, a port block formed with a primary port and a secondary port, and a filter element attached to the port block. The filter element is adapted to remove foreign matters from air flowing through the primary port, the matter being composed of liquid droplets such as water droplets, and dust such as powdery and granular materials, and to discharge the purified air to the secondary port. In order to receive the foreign matter, such as liquid droplets, removed by the filter element, a filter bowl, namely, a collection container is attached to the port block.

As a filter to be used in the pneumatic circuit, forms called air filter, mist filter, and micro mist filter are known, and these filters are defined according to foreign matter removal performance set on the basis of an inner diameter of an air hole of a filter element or the like.

A filter adapted to swirl liquid to remove foreign matter mixed in liquid coolant is disclosed in Japanese Patent Laid-Open Publication No. 2011-51055. This filter is adapted to swirl liquid to remove foreign matter from liquid on the basis of the difference in specific gravity and centrifugal force between the liquid and foreign matter.

In a filter adapted to swirl air in a separation cylinder to utilize the difference in centrifugal force between air and foreign matter, in order to remove foreign matter such as liquid droplets or dust from air, the foreign matter falls down along an inner peripheral surface of the separation cylinder, while air purified by removing the foreign matter is supplied outside via an exhaust pipe disposed in the center of the cylinder.

In the filter adapted to swirl air to fall liquid droplets or the like in air into the collection container as just described, foreign matter such as liquid droplets fall down into the collection container via an exhaust port at a lower end portion of the separation cylinder, while being guided along the inner peripheral surface of the separation cylinder. If the inner peripheral surface of the separation cylinder has a conical shape and its inner diameter is gradually reduced toward the lower end portion of the separation cylinder, in particular, if a lot of liquid droplets are contained in air supplied from outside, foreign matter removal efficiency tends to be reduced.

In pursuit of the cause of the efficiency reduction, it was found that a bridge phenomenon may occur due to condensation of liquid droplets falling along a conical inner peripheral surface in the vicinity of the exhaust port. That is, when the pressure in a storage chamber of the collection container becomes higher than that of a separation chamber of the separation cylinder by a rapid drop or the like in secondary side pressure, a membrane is formed by condensation of liquid droplets in the vicinity of the exhaust port. Since pushing-up force due to the pressure in the storage chamber acts on this water membrane, the water membrane shuts the exhaust port without falling down. When this bridge phenomenon occurs, liquid shuts the exhaust port without falling down by its own weight into the collection container via the exhaust port, and liquid is mixed with air flowing toward the exhaust pipe and discharged via the secondary port, so that such a bridge phenomenon causes a reduction in foreign matter removal efficiency.

An object of the present invention is to remove foreign matter such as liquid droplets with high efficiency from air by using a filter.

SUMMARY OF THE INVENTION

A filter according to the present invention for separating foreign matter such as dust from air, comprises: a separation unit including a primary port to which the air is supplied, a swirl flow generating portion which changes the air supplied from the primary port into swirl flow, a separation chamber communicating with the swirl flow generating portion, and a secondary port which causes purified air from which foreign matter has been removed in the separation chamber to flow out; a collection container attached to the separation unit, the collection container having a storage chamber in which foreign matter exhausted from an exhaust port formed at a lower end portion of the separation unit is stored; and an exhaust pipe arranged at a central portion of the swirl flow generating portion to guide purified air to the secondary port, wherein the separation unit has a conical portion formed with a conical surface reduced in diameter toward the exhaust port, wherein the conical portion is formed with a communication hole through which the separation chamber and the storage chamber communicate with each other.

In the filter according to the present invention, in a case where a position of the primary port is defined as an angle of 0 degree, the communication hole is formed within a range between 270 and 90 degrees in angle defined with respect to a center axis of the primary port. In the filter according to the present invention, the communication hole is formed within a range between 0 and 90 degrees in angle defined with respect to a center axis of the primary port. In the filter according to the present invention, the communication hole is formed at a position defined as an angle of 45 degrees in a swirling direction. In the filter according to the present invention, an inclination angle of the conical surface with respect to a center axis of the separation unit is within a range between 20 and 30 degrees, and an inner diameter of the exhaust port is within a range between 6.5 and 10.5 mm.

According to the present invention, since the communication hole through which the separation chamber and the storage chamber communicate with each other is formed in the conical portion which separates the separation chamber in the separation unit from the storage chamber in the collection container, the pressure in the separation chamber and the pressure in the storage chamber are kept equal to each other.

Therefore, the liquid formed by condensation of liquid droplets guided along the conical surface, that is, an inner peripheral surface of the conical portion is prevented from forming a bridge so as to close the exhaust port, and reliably falls down into the storage chamber from the exhaust port by its own weight. Therefore, since it is possible to prevent liquid from being mixed with air flowing toward the exhaust pipe, and flowing toward the secondary port, so that the foreign matter removal efficiency can be enhanced.

According to the present invention, the communication hole is not situated nearer the secondary side, in the case where an angle is defined with respect to a center axis of the primary port, and a position of the primary port corresponds to an angle of 0 degree, the communication hole is provided within a range between 270 and 90 degrees. Therefore, it is possible to enhance a removal effect of condensate liquid, that is, drain liquid. Furthermore, in the case where an angle is defined with respect to a center axis of the primary port, it is more preferable that the communication hole be formed within a range between 0 and 90 degrees, and it is further preferable that the communication hole be formed at an angle of 45 degrees defined in the swirling direction.

BRIEF DESCRIPTIONS OF THE DRAWINGS

DESCRIPTIONS OF THE PREFERRED EMBODIMENTS

Figure 1:
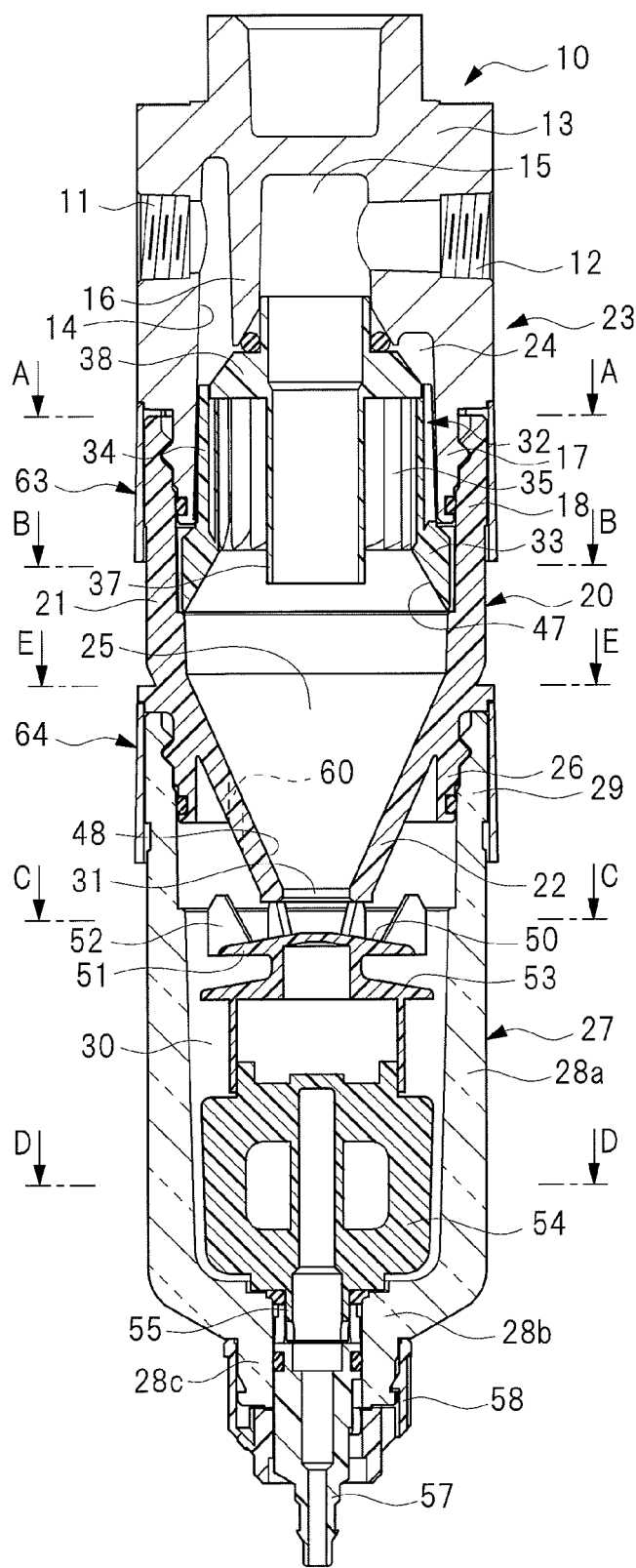
FIG. 1 is a cross sectional view showing a filter according to one embodiment of the present invention.
Figure 9:
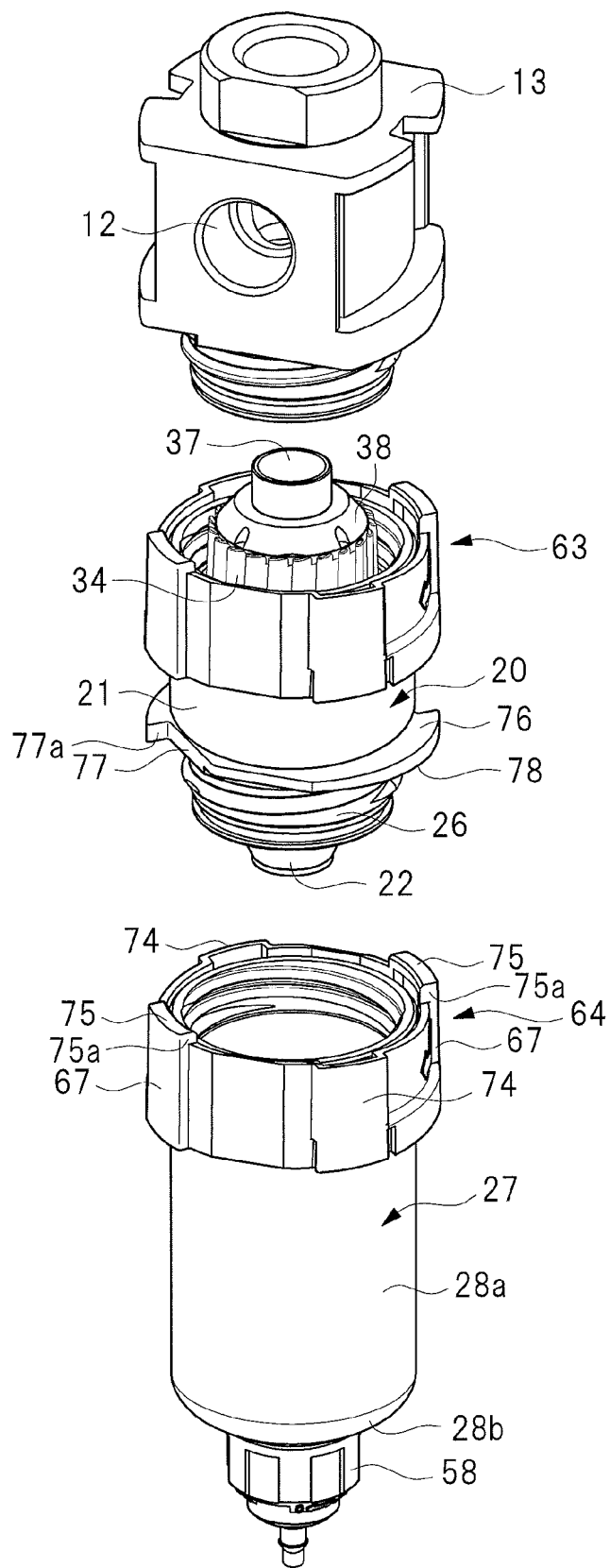
FIG. 9 is an exploded perspective view showing the filter.

Hereinafter, embodiments of the present invention will be described in detail with reference to the drawings. As shown in FIG. 1, the filter 10 has a port block 13 made of metal, and is formed with a primary port 11 and a secondary port 12. The primary port 11 is connected to a primary air pressure line composed of a piping (not shown) or the like, and air from an air pressure source is supplied to the primary port 11 via the air pressure line. The secondary port 12 is connected to a secondary air pressure line composed of a piping (not shown) or the like, and purified air from which liquid droplets and the like are removed is supplied to an external air pressure actuating apparatus from the secondary port via the secondary air pressure line. The primary port 11 and the secondary port 12 are coaxially opened at side surfaces of the port block 13 opposite to each other, respectively. Side surfaces of the port block 13 from which the respective ports are opened are formed in an approximately flat shape, and the port block 13 has a shape close to a cubic shape as a whole, as shown in FIG. 9.

The port block 13 is formed with a receiving hole 14, and the primary port 11 is in communication with the receiving hole 14. A supporting portion 16 formed with a communication hole 15 is provided to a central portion of the port block 13, and air supplied to the primary port 11 via a communication space between the supporting portion 16 and the receiving hole 14 flows to a lower portion of the receiving hole 14.

A lower end portion of the port block 13 is provided with a cylindrical male screw portion 17. A separation cylinder 20 made of resin is detachably attached to the male screw portion 17, and an upper end portion of the separation cylinder 20 is provided with a female screw portion 18 which is screwed to the male screw portion 17. The separation cylinder 20 has a cylindrical portion 21 having a constant inner diameter, and a conical portion 22 continuously extending downward from a lower portion of the cylindrical portion 21 and having an inner diameter gradually reduced toward a lower end portion thereof. A separation unit 23 is composed of the port block 13 and the separation cylinder 20 attached to this block. The separation unit 23 is formed with an upper side swirl flow generating chamber 24 and a lower side separation chamber 25 which communicate with each other. The separation unit 23 shown in this figure is configured so that the swirl flow generating chamber 24 is formed of the port block 13 and the separation cylinder 20, but it may be configured so that the swirl flow generating chamber 24 is formed of the port block 13 and the separation chamber 25 is formed of the separation cylinder 20, or it may be configured so that the swirl flow generating chamber 24 and the separation chamber 25 are formed in the separation cylinder 20.

The conical portion 22 of the separation cylinder 20 is provided with a male screw portion 26, and the male screw portion 26 is the same in outer diameter as the male screw portion 17 of the port block 13. A collection container 27 is detachably attached to the male screw portion 26. The collection container 27 has a cylindrical portion 28a, and a bottom wall portion 28b integral with the cylindrical portion 28a, and it is made of transparent material. An upper end portion of the collection container 27 is provided with a female screw portion 29 which is screwed to the male screw portion 26. The female screw portion 29 is the same in inner diameter as the female screw portion 18 of the cylindrical portion 21 of the separation cylinder 20. The collection container 27 is formed with a storage chamber 30 in which foreign matter such as liquid droplets and the like are received, and the inside of the separation cylinder 20 and the storage chamber 30 are in communication with each other via an exhaust port 31 formed at a lower end portion of the separation cylinder 20.

Figure 2:
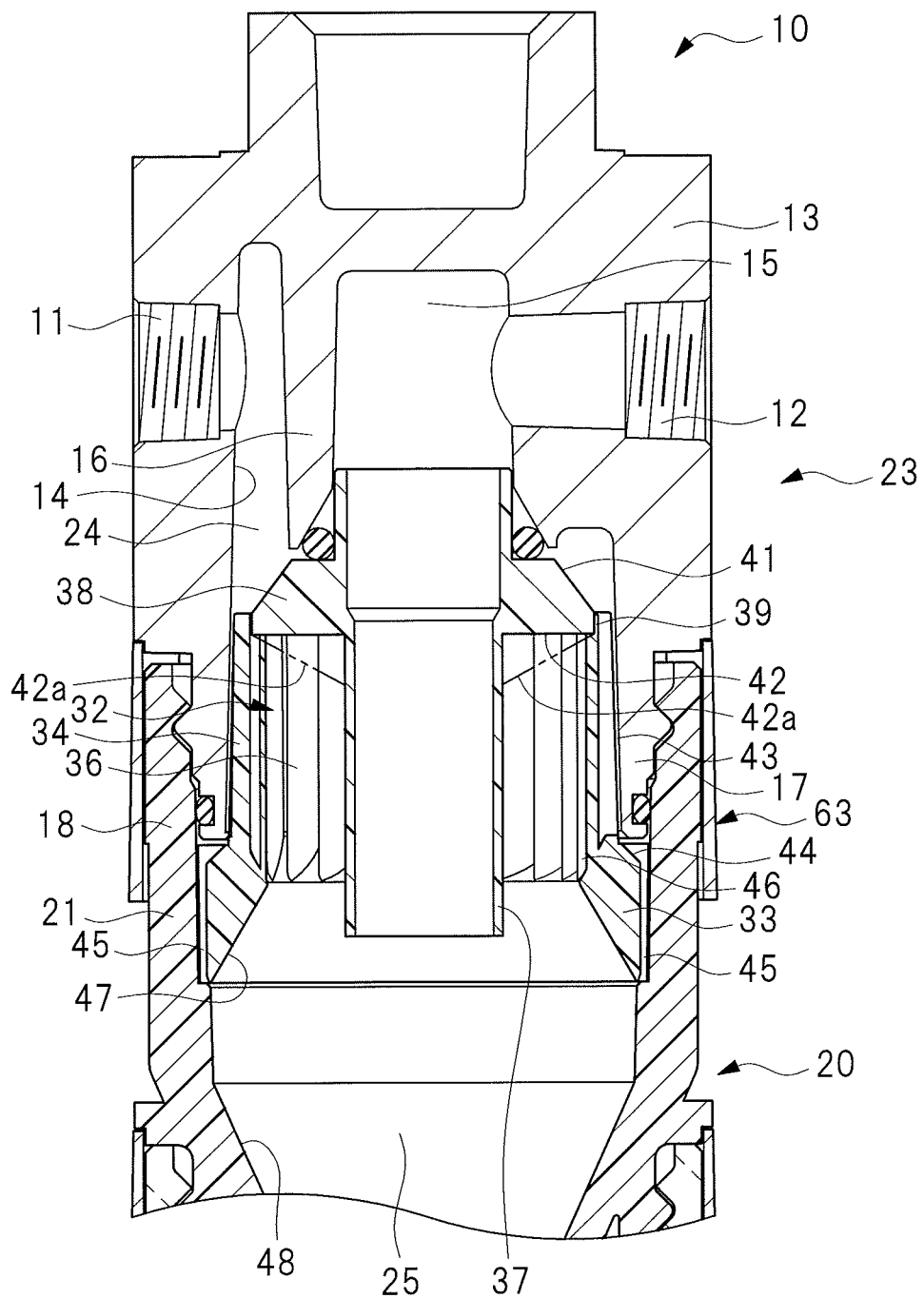
FIG. 2 is an enlarged sectional view showing the upper half of the filter shown in FIG. 1.
Figure 4:
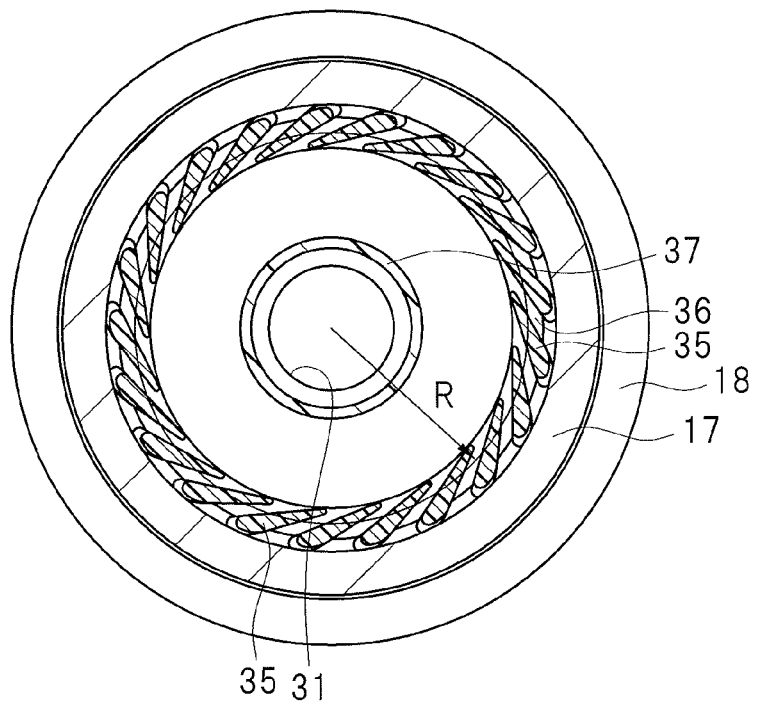
FIG. 4 is a cross sectional view taken along the line A-A in FIG. 1.

A swirl flow generator 32 made of resin is attached in the swirl flow generating chamber 24 of the separation unit 23. The swirl flow generator 32 serving as a swirl flow generating portion has an annular base portion 33 which is fitted to an inner peripheral surface of the cylindrical portion 21 of the separation cylinder 20. The annular base portion 33 is integral with a cylindrical blade portion 34. As shown in FIGS. 2 and 4, the cylindrical blade portion 34 is provided with a plurality of wings or blades 35 extending in an axial direction along an inner peripheral surface of the receiving hole 14, that is, an inner peripheral surface of the swirl flow generating chamber 24, and the blades 35 are formed and arranged in a cylindrical shape at intervals of clearances 36. As shown in FIG. 4, each of the blades 35 has an inclination angle to a tangential line to the inner peripheral surface of the cylindrical blade portion 34. By having the blades 35 inclined in this manner, flow of air is changed to swirling flow. In addition, since many blades 35 are arranged over a whole circumference of the cylindrical blade portion 34 and have lengths in the axial direction, swirling flow can be obtained efficiently with low pressure though the cylindrical blade portion 34 is thin in a radial direction. The cylindrical blade portion 34 is composed of 21 blades 35. As shown in FIG. 4, the respective blades 35 are set that wall thicknesses thereof on a radially inner side are thinner than those thereof on a radially outer side, and the clearances 36 formed mutually among the respective blades extend along the central axis of the separation unit 23 in an axial direction and incline in a circumferential direction.

An exhaust pipe 37 is attached in the communication hole 15, and a lower end surface of the exhaust pipe 37 extends beyond the cylindrical blade portion 34 downward to reach the position of the annular base portion 33. Air purified by separation of foreign matter is guided to the secondary port 12 via the exhaust pipe 37. The exhaust pipe 37 is integral with a closing lid portion 38, and this closing lid portion 38 is arranged at the upper end portion of the cylindrical blade portion 34. Air flowing from the primary port 11 into the receiving hole 14 is prevented by the closing lid portion 38 from flowing into the cylindrical blade portion 34 from a radial inner side of the cylindrical blade portion 34.

Thus, the swirl flow generator 32 is composed of the cylindrical blade portion 34 formed into a cylindrical shape as a whole, the annular base portion 33 arranged at the lower end portion of the cylindrical blade portion 34 and fitted into the inner peripheral surface of the cylindrical portion 21 of the separation cylinder 20, and the closing lid portion 38 arranged at the upper end portions of the cylindrical blade portion 34 and the exhaust pipe 37. Therefore, air supplied from the primary port 11 into the receiving hole 14 flows in the swirl flow generating chamber 24 in the axial direction to flow from an upper outer peripheral surface of the cylindrical blade portion 34 in the clearances 36 among the blades 35. Air flowing in the respective clearances 36 is guided by the blades 35 to be jetted toward the inside of the cylindrical blade portion 34 in an inclined manner to the tangential direction. Therefore, swirling flow of air is produced inside the cylindrical blade portion 34, and the swirl flow flows into the lower-side separation chamber 25 in the separation cylinder 20 while being swirled. When the air is changed to the swirl flow, centrifugal force larger than that applied to air is applied to liquid droplets having a specific gravity larger than that of air, so that the liquid droplets adhere to an inner peripheral surface of the conical portion 22. The liquid droplets adhered to the inner peripheral surface drop from the exhaust port 31 into the storage chamber 30.

As described above, the cylindrical blade portion 34 formed by arranging the blades 35 in a cylindrical shape is integrated with the annular base portion 33, and the closing lid portion 38 integrated with the exhaust pipe 37 is fitted into a distal end portion of the cylindrical blade portion 34. However the cylindrical blade portion 34 and the closing lid portion 38 may be integrated with each other, and the annular base portion 33 may abut on the lower end surface of the cylindrical blade portion 34. Furthermore, in this embodiment, the exhaust pipe 37 and the closing lid portion 38 are integrated with each other, however these members may be separated from each other.

As shown in figures, air flowing from the primary port 11 into the swirl flow generating chamber 24 flows from an outer peripheral portion of the swirl flow generating chamber 24 to the swirl flow generator 32 in the axial direction so that axial flow is changed into swirl flow. Since 21 blades 35 are arranged over the whole circumference of 360 degrees, inflow air is applied with a swirling force over the whole circumference of 360 degrees. Therefore, as compared with a case where air is caused to flow from an intake port to an inner peripheral surface of the separation cylinder 20 in a tangential direction to the separation cylinder 20 as disclosed in Japanese Patent Laid-Open Publication No. 2011-51055, a high speed swirl flow can be produced efficiently without making the inner diameter of the separation cylinder 20 large. Accordingly, the filter which forms swirl flow to remove liquid droplets contained therein can be made small in size.

The separation cylinder 20 has the cylindrical portion 21 and the conical portion 22 positioned at the bottom of the cylindrical portion 21, and centrifugal force acting on swirl flow produced by the swirl flow generator 32 can be prevented from being attenuated at the conical portion 22. That is, in the case where the separation cylinder is not provided with the conical portion 22 and has a fixed inner diameter, the swirl flow is accelerated in the vicinity of the swirl flow generator 32, but slow at a point distant from the swirl flow generator 32 and close to the exhaust port 31. Here, if the separation cylinder is formed into a conical shape so that the swirl flow becomes smaller in radius with getting closer to the exhaust port 31, since the swirl flow becomes smaller in radius, the swirl flow is not decelerated. In this way, in the conical portion 22, it is possible to prevent the swirl flow from being reduced in centrifugal force. Therefore, when the lower portion of the separation cylinder 20 is formed in a conical shape, a separation efficiency of foreign matter due to adhesion of foreign matter such as liquid droplets to the inner peripheral surface can be made higher than that in such an aspect that the whole separation cylinder 20 is formed in a cylindrical shape. Air purified by removing foreign matter while being swirling to flow into the exhaust pipe 37 is discharged from the secondary port 12.

Notched portions 39 are formed on a radially-inner side of the upper end portion of the cylindrical blade portion 34. As shown in FIG. 4, an inner diameter of the notched portions 39 corresponds to an outer diameter R of the lower end portion of the closing lid portion 38, so that the closing lid portion 38 is fitted into the notched portions 39. Since the closing lid portion 38 is fitted into the inside of the upper end portion of the cylindrical blade portion 34 in this manner, the respective blades 35 are prevented from being deformed radially inward. A portion of an outer peripheral surface of the closing lid portion 38 located from a portion positioned above the upper end surface of the cylindrical blade portion 34 to the supporting portion 16 is formed in a taper surface 41 having a diameter reduced upwardly. Therefore, air flowing from the primary port 11 into the swirl flow generating chamber 24 is guided radially outward by the taper surface 41 to flow along the inner peripheral surface of the cylindrical blade portion 34 while flowing from the clearances 36 between the closing lid portion 38 and the receiving hole 14 downward along the respective blades 35, which results in swirl flow.

A lower surface 42 of the closing lid portion 38 is formed in a flat surface extending from an outer peripheral portion to an inner peripheral portion so as to be perpendicular to the central axis of the closing lid portion 38 so that liquid droplets contained in the swirl flow do not adhere to the lower surface 42. Therefore, liquid droplets flowing into the cylindrical blade portion 34 from the outer periphery of the closing lid portion 38 together with air flow downward together with the swirl flow without adhering to the lower surface 42. According to an experiment, when the lower surface 42 is formed in an inclination surface extending upward from the radially outer portion to the radially inner portion, liquid droplets adhere to the lower surface 42. Furthermore, when the lower surface is formed with an annular groove, liquid droplets are captured in the annular groove so that they can not be smoothly dropped. On the other hand, as shown in FIGS. 1 and 2, when the lower surface is formed at a right angle to the central axis or when it is inclined downward from the radially outer portion toward the central portion, as shown by a two-dot chain line 42a in FIG. 2, liquid droplets are prevented from adhering to the lower surface 42.

Figure 5:
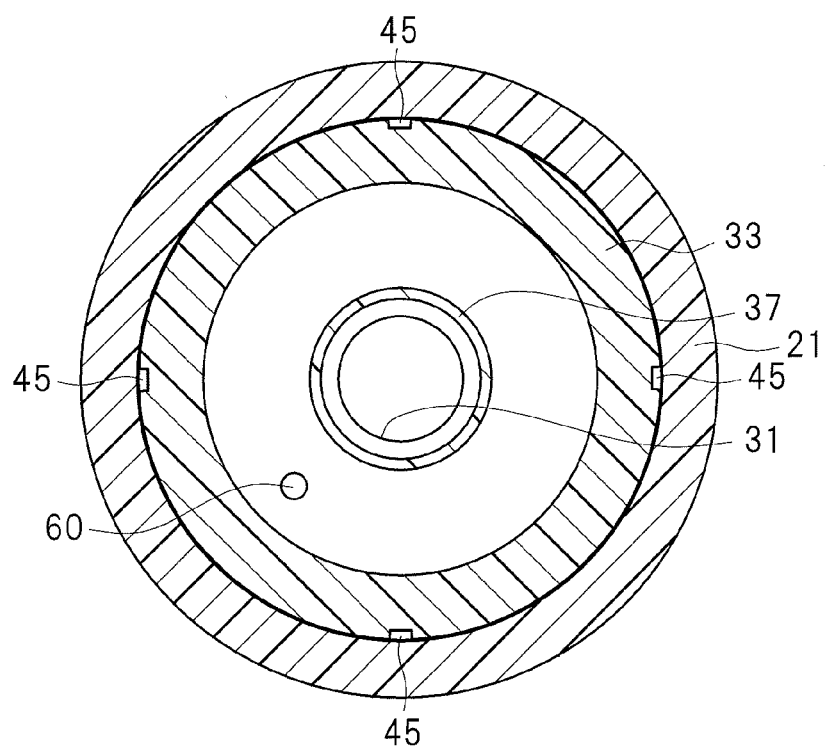
FIG. 5 is a cross sectional view taken along the line B-B in FIG. 1.

A clearance 43 is formed between the inner peripheral surface of the receiving hole 14 and the outer peripheral surface of the cylindrical blade portion 34. Liquid droplets mixed in flowing from the primary port 11 into the swirl flow generating chamber 24 are partially guided by the clearance 43 between the blades 35 and the inner peripheral surface of the receiving hole 14 to flow to the lower end portions of the blades 35. As shown in FIG. 2, the annular base portion 33 has a first portion on the outside of an cylindrical area defined by an outer diameter of the cylindrical blade portion 34, and a downwardly-inclined liquid droplet guiding surface 44 extending in a radially-outward direction is formed as the upper surface of the first portion of the annular base portion 33. As shown in FIG. 5, a plurality of liquid exhaust grooves 45 is formed on an outer peripheral surface of the annular base portion 33, and liquid droplets flowing down to the outermost peripheral potion of the liquid droplet guiding surface 44 are guided from the respective liquid exhaust grooves 45 to the separation cylinder 20. On the other hand, the annular base portion 33 has a second portion within an annular area defined between the outer peripheral surface and the inner peripheral surface of the cylindrical blade portion 34, and a downwardly-inclined liquid droplet guiding surface 46 extending in a radially-inward direction is formed on the upper surface of the second portion of the annular base portion 33.

Therefore, liquid droplets flowing downward via the clearances 36 among the blades 35 to reach the upper surface of the annular base portion 33 drop from the minimum diameter portion of the inclined liquid droplet guiding surface 46 downward. In this way, among liquid droplets such as water droplets and oil droplets which flow from the primary port 11 into the swirl flow generating chamber 24 together with air, liquid droplets flowing between the outer peripheral surface of the cylindrical blade portion 34 and the receiving hole 14 are guided by the liquid droplet guiding surface 44, and then guided from the liquid exhaust grooves 45 to the inner peripheral surface of the separation cylinder 20. Therefore, they can be securely prevented from entering the exhaust pipe 37. In particular, even if an amount of air supplied to the primary port 11 is rapidly increased, liquid droplets can be securely prevented from being involved in the exhaust pipe 37. On the other hand, liquid droplets that drop along the blades 35 down to the liquid droplet guiding surface 46 to drop are guided by the liquid droplet guiding surface 46 to drop below the annular base portion 33, so that liquid droplets can be securely prevented from being involved in the exhaust pipe 37. As shown in FIG. 5, the number of liquid exhaust grooves 45 provided is four, but the number may be set to an arbitrary number. Furthermore, the liquid exhaust grooves 45 may be formed on the inner peripheral surface of the cylindrical portion 21.

A lower surface of the annular base portion 33 is formed in a taper surface 47 inclined downward so that an inner diameter thereof becomes larger from the minimum diameter portion of the liquid droplet guiding surface 46 to the outer peripheral surface of the annular base portion 33. When the lower surface of the annular base portion 33 is formed in a diameter-enlarged portion expanded so that an inner diameter of the lower surface becomes larger downward, namely in the taper surface 47, air guided by the blades 35 to be changed to swirl flow is guided to the separation chamber 25 of the separation cylinder 20 while a swirling radius thereof becomes larger toward the taper surface 47. The lower end surface of the exhaust pipe 37 is set to be the same axial position as that of the annular base portion 33, and a radially outer side of the lower end portion of the exhaust pipe 37 corresponds to the annular base portion 33, but an inner surface of the annular base portion 33 is formed in such a taper surface 47 that an inner diameter thereof becomes larger downward, so that liquid droplets attached to the taper surface 47 can be securely prevented from being involved in the exhaust pipe 37. In particular, even if an amount of inflow air from the primary port 11 is rapidly increased, liquid droplets can be prevented from being involved in the exhaust pipe 37.

In such a case that a distance between the inner peripheral surface of the annular base portion 33 and the outer periphery of the exhaust pipe 37 is short, if the inner peripheral surface of the annular base portion 33 is made straight, there is such a possibility that liquid droplets are ingested into the exhaust pipe 37, but liquid droplets can be securely prevented from entering the exhaust pipe 37 by forming the inner peripheral surface in the taper surface 47. The diameter-enlarged portion formed on the annular base portion 33 is not limited to the taper surface but if an inner diameter is set to be larger than the inner diameter of the cylindrical blade portion 34, even if a diameter-enlarged portion having a straight inner diameter is adopted, it can prevent liquid droplets from being ingested into the exhaust pipe 37.

Air flowing from the taper surface 47 into the separation chamber 25 and swirling along the inner peripheral surface of the cylindrical portion 21 is guided by the inner peripheral surface of the conical portion 22 reduced in inner diameter toward the lower end portion, namely, a conical surface 48. In air flowing along the conical surface 48, centrifugal force generated is maintained and liquid droplets contained in the air adhere to the conical surface 48 of the conical portion 22 to flow toward the exhaust port 31 at the lower end portion.

As described above, by forming the liquid droplet guiding surface 44 on a portion of the upper surface of the annular base portion 33 positioned radially outside and forming the liquid droplet guiding surface 46 on a portion of the annular base portion 33 positioned radially inside, liquid droplets flowing down to the upper surface of the annular base portion 33 can be securely dropped downward.

Figure 3:
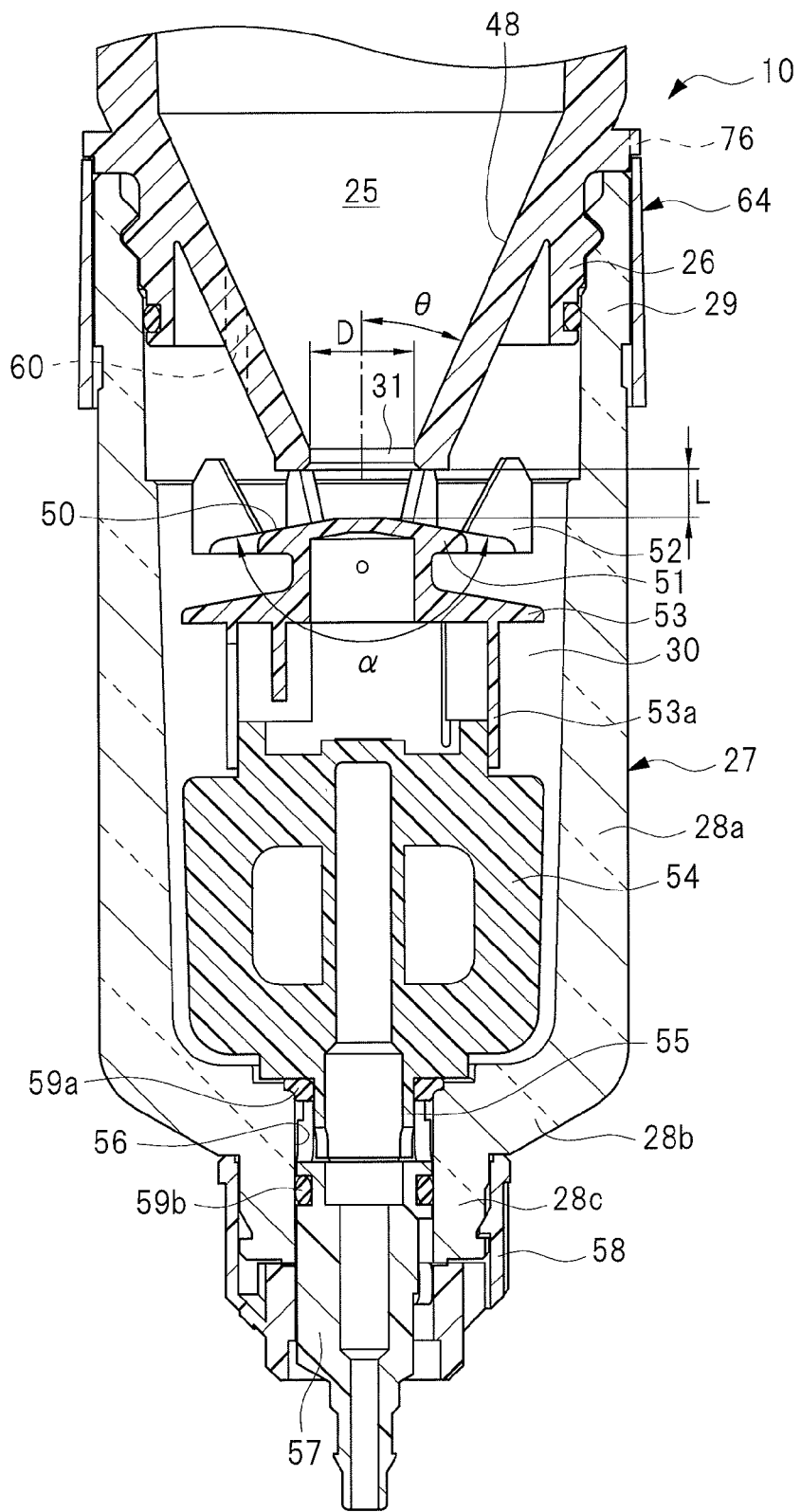
FIG. 3 is an enlarged sectional view showing the lower half of the filter shown in FIG. 1.
Figure 6:
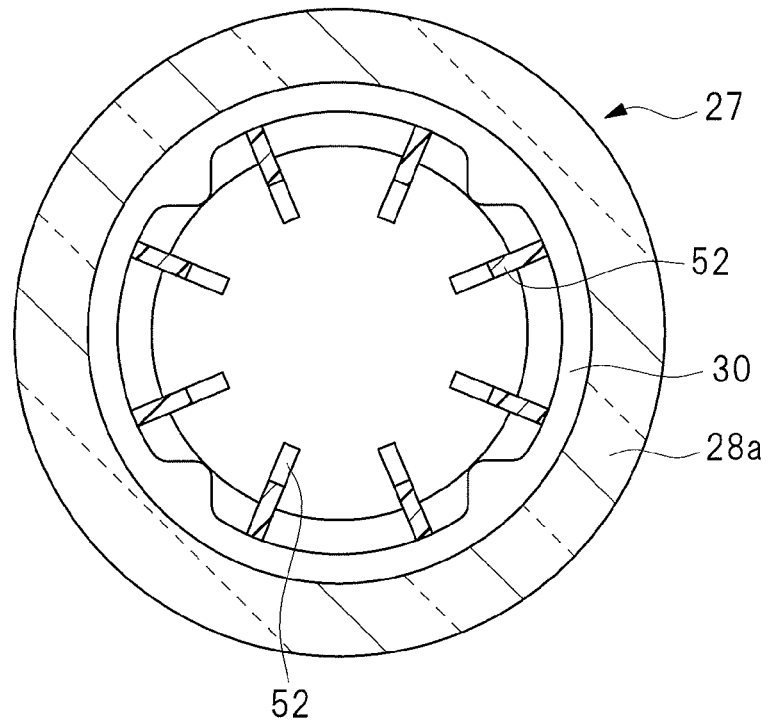
FIG. 6 is a cross sectional view taken along the line C-C in FIG. 1.

A baffle plate 51 provided with a liquid guiding surface 50 opposed to the exhaust port 31 is disposed in the collection container 27. As shown in FIG. 3, liquid droplets dropped from the exhaust port 31 stay on the bottom of the storage chamber 30, and liquid droplets on the bottom of the storage chamber 30 are prevented from flowing back into the separation chamber 25 due to tornado phenomenon of the swirl flow, since the baffle plate 51 is opposed to the exhaust port 31 via a clearance of a baffle arrangement distance L. Eight fins 52 extending in a radial direction of the liquid guiding surface 50 and projecting upwardly, respectively, are provided radially on the liquid guiding surface 50 of the baffle plate 51, as shown in FIGS. 3 and 6. Thus, air in the storage chamber 30 is prevented from being swirled in accordance with air swirled in the exhaust port 31 by the plurality of radial fins 52. Thus, liquid in the storage chamber 30 is prevented from being moved upward in an ingesting manner by the tornado phenomenon due to swirling of air in the storage chamber 30 to flow out to the secondary port 12 by the baffle plate 51 provided with fins 52. Furthermore, air swirled downward along the conical surface 48 is reflected by the baffle plate 51 in a reverse direction and moved upward toward the exhaust pipe 37.

Figure 7:
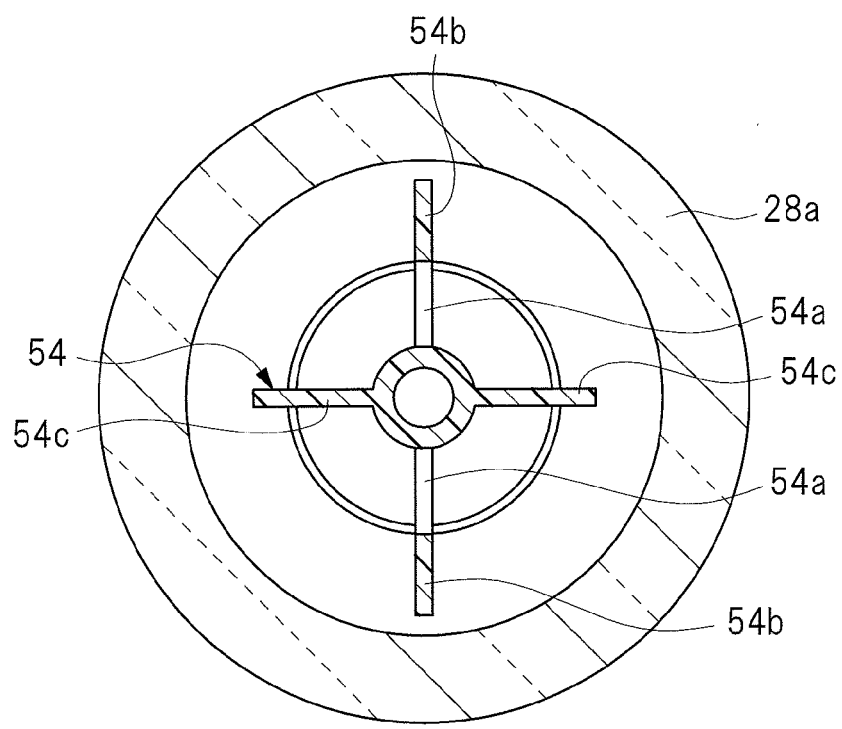
FIG. 7 is a cross sectional view taken along the line D-D in FIG. 1.
Figure 8:
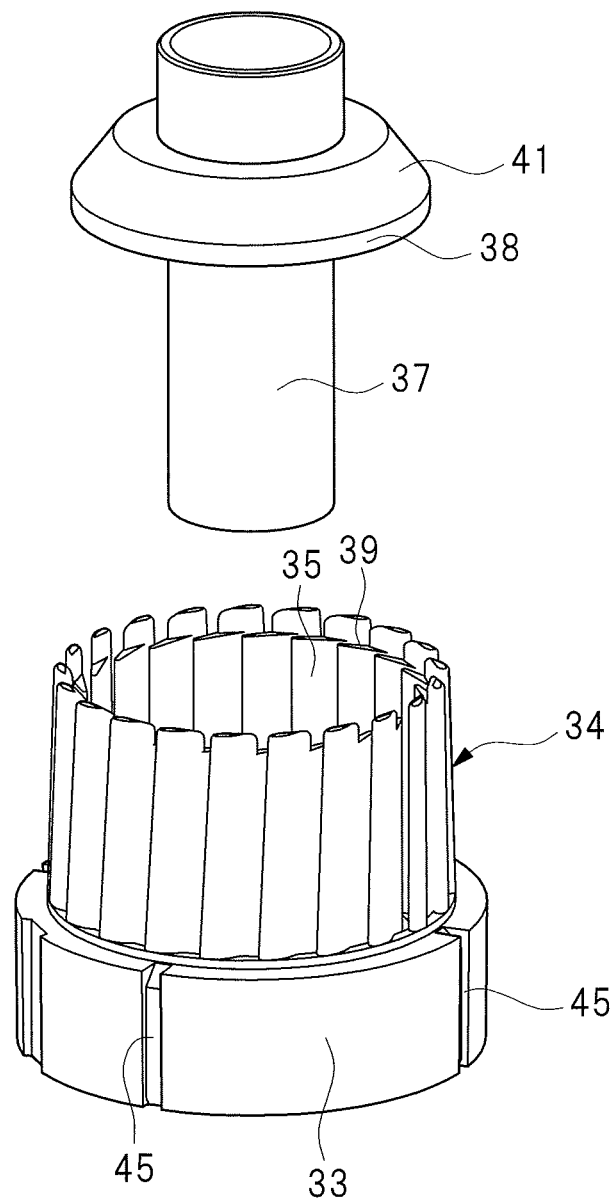
FIG. 8 is an exploded perspective view showing the swirl flow generator shown in FIGS. 1 and 2.

The baffle plate 51 is integrated with a base plate 53 which is located just below the baffle plate 51, and which has a diameter larger than that of the baffle plate 51. As shown in FIG. 7, a cross-shaped leg portion 54 is attached to the base plate 53 via a coupling portion 53a shown in FIG. 3. As well as the leg portion 54, the leg portion 54 includes four plate-like members extending radially from a radial central portion of the leg portion 54. The leg portion 54 is composed of two large-diameter plates 54b extending near the inner peripheral surface of the collection container 27 and having a notch hole 54a near the axial center of the leg portion 54 and two small-diameter plates 54c having a large clearance between the inner peripheral surface of the collection container 27 and each of the small-diameter plates 54c. Therefore, air is securely prevented from being swirled in the storage chamber 30. A coupling portion 55 provided at the lower portion of the leg portion 54 is assembled in an exhaust hole 56 formed in a bottom wall portion 28b of the collection container 27, and an exhaust pipe 57 inserted into a lower side of the exhaust hole 56 is coupled to the coupling portion 55. The exhaust pipe 57 is engaged with a cam portion of an operation knob 58 rotatably attached on an outer periphery of an exhaust port 28c provided on the bottom wall portion 28b, so that the exhaust pipe 57 is moved vertically by operating the operation knob 58 in a rotating manner. When the exhaust pipe 57 is moved upward by the operation knob 58, a seal member 59a provided on the coupling portion 55 is separated from the bottom wall portion 28b. Therefore, liquid in the storage chamber 30 is exhausted outside via the exhaust pipe 57.

As shown in FIG. 3, when the inner diameter of the exhaust port 31 of the separation cylinder 20 is represented as "D" and an conical angle of the conical portion 22 of the lower end portion of the separation cylinder 20 is represented as "θ", the inner diameter D and the conical angle θ are set to 6.5 to 10.5 mm and 20 to 30 degrees, respectively. Therefore, it is confirmed that liquid droplets could be caused to adhere to the inner surface of the conical portion 22 and adhered liquid droplets could be exhausted from the exhaust port 31 to the storage chamber 30, so that a liquid droplets removal effect could be enhanced.

When a surface angle of the liquid guiding surface 50 of the baffle plate 51 is represented as α and a baffle arrangement distance between the exhaust port 31 and the liquid guiding surface 50 is represented as L, the surface angle α and the baffle arrangement distance L are set to 90 to 180 degrees and 5 to 15 mm, respectively. Therefore, liquid droplets dropped from the exhaust port 31 downward are securely prevented from rising to flow back into the separation chamber 25. When the baffle arrangement distance L is set to be shorter than 5 mm, there is a possibility that liquid droplets adhering to the liquid guiding surface 50 of the baffle plate 51 flow back into the separation cylinder 20. On the contrary, when the baffle arrangement distance L is set to be larger than 15 mm, there is such a possibility that liquid droplets passed through the exhaust port 31 stay on the liquid guiding surface 50, and the liquid droplets stayed are raised and scattered by a tornado phenomenon due to change of a flow rate or the like so that they flow back from the exhaust port 31 into the separation cylinder 20. Regarding the surface angle α, liquid droplets can be securely prevented from flowing back from the baffle plate 51 by setting the surface angle α to the above-described angle range.

Figure 10:
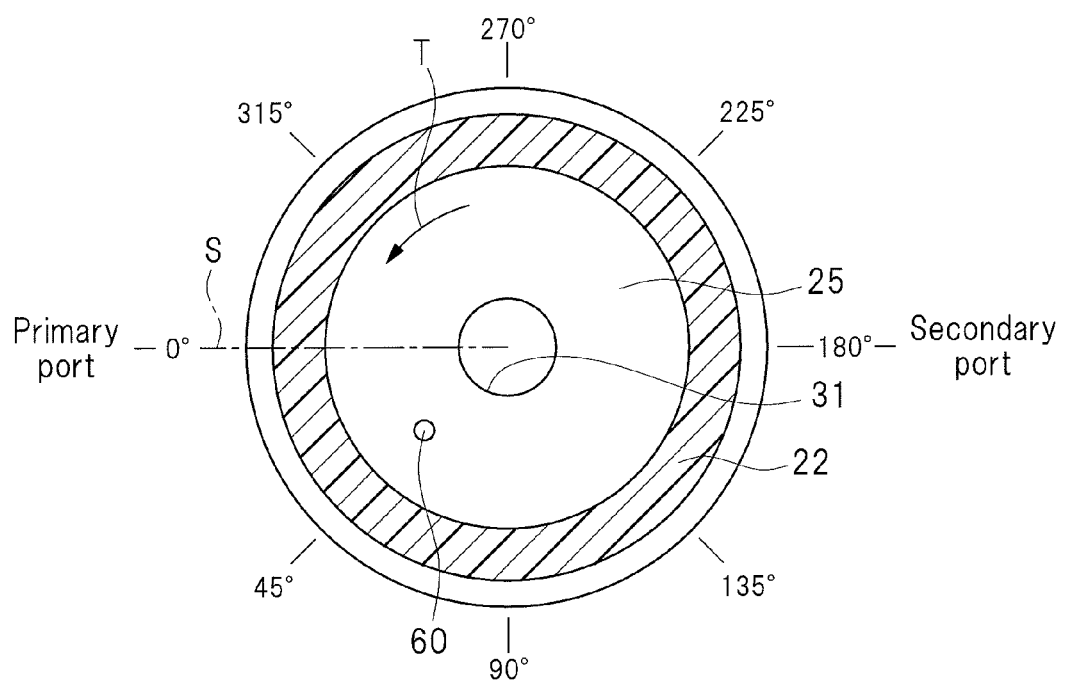
FIG. 10 is a cross sectional view taken along the line E-E in FIG. 1.

FIG. 10 is a sectional view taken along the line E-E in FIG. 1. The conical portion 22 is formed with a communication hole 60, as a breathing hole, through which the separation chamber 25 and the storage chamber 30 communicate with each other. As it is formed with the communication hole 60, even when the pressure in the storage chamber 30 becomes higher than the pressure in the separation chamber 25 due to rapid lowering of secondary pressure or the like, the pressures in the separation chamber 25 and the storage chamber 30 rapidly become equal to each other by the communication hole 60, and therefore the bridge phenomenon does not occur, and the liquid droplets reliably fall down into the storage chamber 30 by their own weight.

When the respective amounts of condensate liquid falling into the collection container 27, namely, drain removal rates of a filter provided with the communication hole 60 in the conical portion 22 and a filter which is not provided with the communication hole 60 in the conical portion 22 were compared, the phenomenon that the condensate liquid bridged the exhaust port 31 and the condensate liquid scattered toward the secondary port 12 was visually confirmed in the filter which is not provided with the communication hole 60. On the other hand, in the filter provided with the communication hole 60, when air having the same water content was supplied to the primary port, regardless of the position of the communication hole 60 provided in the circumferential direction of the conical portion 22, the occurrence of the bridge phenomenon of the condensate liquid was not confirmed, and the drain removal rate can be enhanced.

Figure 11A:
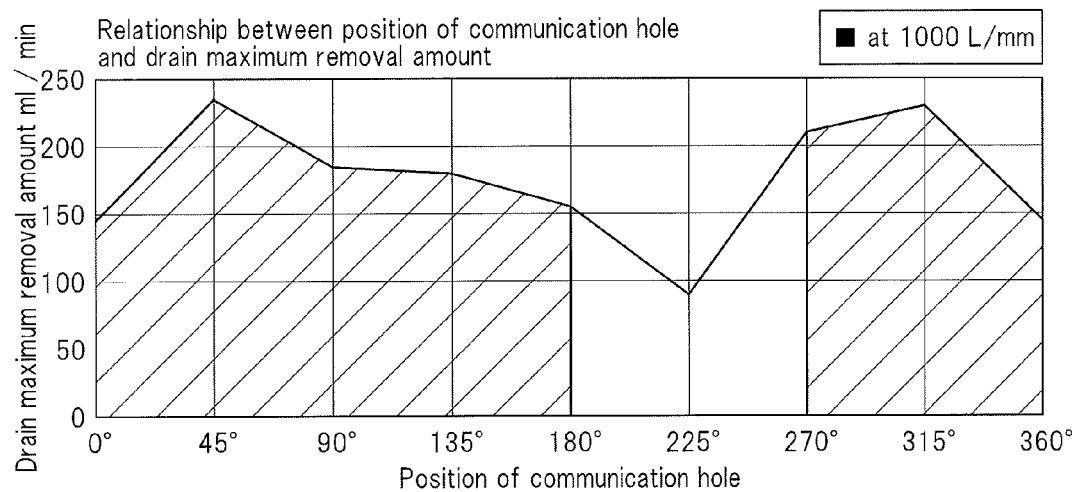
FIG. 11A is a removal characteristic diagram of a relationship between a position of a communication hole in a circumferential direction and a drain removal amount.
Figure 11B:
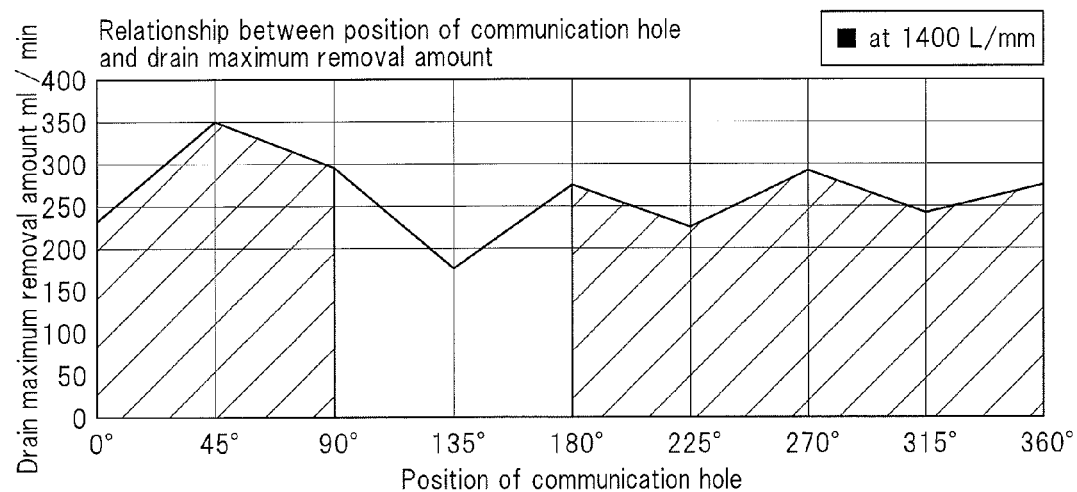
FIG. 11B is a removal characteristic diagram of a relationship between a position of a communication hole in circumferential direction and a drain removal amount.

FIGS. 11A and 11B are removal characteristic diagrams showing a relationship between the position of the communication hole 60 in a circumferential direction and a drain maximum removal amount. As shown in FIG. 10, a line extending in a radial direction of the conical portion 22 parallel with the center axis of the primary port 11 is defined as a reference line S. A swirling direction of the swirling flow in the separation chamber 25 is defined as T. A drain maximum removal amount is shown in FIGS. 11A and 11B with an angle being changed in a circumferential direction at intervals of 45 degrees.

FIG. 11A shows a case where 1000 liters of air per minute are supplied from the primary port 11, and FIG. 11B shows a case where 1400 liters of air per minute were supplied from the primary port 11. In the process of gradually increasing the amount of water in air to be supplied to the primary side, when the amount of water in air is small, water does not flow out to the secondary side. On the other hand, with increased amount of water in air, water begins to flow out to the secondary side. A primary side maximum amount of water which can be removed without flowing out to the secondary side is defined as a drain maximum removal amount in FIGS. 11A and 11B. The primary side water content is an amount (milliliter) per unit time (for one minute).

As shown in FIG. 11A, in the case where 1000 liters of air per minute are supplied, it was found that, with the communication hole 60 being disposed at about an angle of 225 degrees in the swirling direction with respect to the reference line "S", the drain removal rate is increased, on the other hand, with the communication hole 60 being disposed in the vicinity of an angle of 45 degrees in the swirling direction, the drain removal rate is high, furthermore, with the communication hole 60 being disposed in the vicinity of an angle of 315 degrees in the swirling direction, that is, 45 degrees in a direction opposite to the swirling direction, the drain removal rate is high. In FIG. 11A, a range within which the drain removal rate is high is hatched.

On the other hand, as shown in FIG. 11B, in the case where 1400 liters of air per minute are supplied, it was found that, with the communication hole 60 being disposed at about an angle of 135 degrees in the swirling direction with respect to the reference line "S", the drain removal rate is low. On the other hand, with the communication hole 60 being disposed at about an angle of 45 degrees in the swirling direction, the drain removal rate is high. Furthermore, with the communication hole 60 being disposed within a range between 180 and 360 degrees in the swirling direction, the drain removal rate is improved in comparison with the case where the communication hole 60 is disposed at about 135 degrees in the swirling direction. In FIG. 11B, the range within which the drain removal rate is high is hatched.

As can be seen from FIGS. 11A and 11B, a case where a good drain removal rate can be obtained in both of the supply air flow rates is a case where the communication hole 60 is disposed within the range of 90 degrees in the swirling direction T from the position of the reference line S corresponding to the center axis of the primary port 11 and within the range of 90 degrees in a direction opposite to the swirling direction T. On the other hand, it was found that the drain removal rate was lower when the communication hole 60 was disposed out of the above ranges than when the communication hole 60 was disposed within the above ranges. Therefore, disposing the communication hole 60 within the range of 90 degrees in the swirling direction of the swirling flow and in the opposite direction from the position of the reference line S corresponding to the position of the center axis of the primary port 11 is preferred to disposing the communication hole 60 out of the range in order to enhance the drain removal rate.

Furthermore, it can be understood that in order to increase the drain removal rate, it is further preferred that in both cases in FIGS. 11A and 11B, the communication hole 60 be disposed within a range between 0 to 90 degrees in the swirling direction from the position of the reference line S corresponding to the center axis of the primary port 11. Furthermore, it has been found that it is preferred that the communication hole 60 be disposed at 45 degrees in the range between 0 to 90 degrees, and, as shown in FIG. 10, in this filter 10, the communication hole 60 be disposed at 45 degrees in the swirling direction. It is desired that the diameter of the communication hole 60 be in a range between 1 and 3 mm, and it is further desired that the diameter of the communication hole 60 be in a range between 1.5 and 2 mm. If the diameter of the communication hole 60 is less than these sizes, the communication hole 60 is closed by liquid droplets and cannot function as a communication hole. If the diameter of the communication hole 60 is more than these sizes, the communication hole 60 has a large effect on the swirling flow, and the separation efficiency decreases.

As shown in FIG. 1, an annular lock member 63 made of resin is attached to the outside of the female screw portion 18 of the separation cylinder 20 movably in an axial direction in order to lock a state where the separation cylinder 20 is fastened to the male screw portion 17 of the port block 13 and operate unlocking when the separation cylinder 20 is detached from the port block 13. Similarly, an annular lock member 64 made of resin is attached to the outside of the female screw portion 29 of the collection container 27 in order to lock a state where the collection container 27 has been fastened to the male screw portion 26 of the separation cylinder 20 and operate unlocking when the collection container 27 is detached from the separation cylinder 20. The respective locking members 63 and 64 have the same structure mutually.

Figure 12:
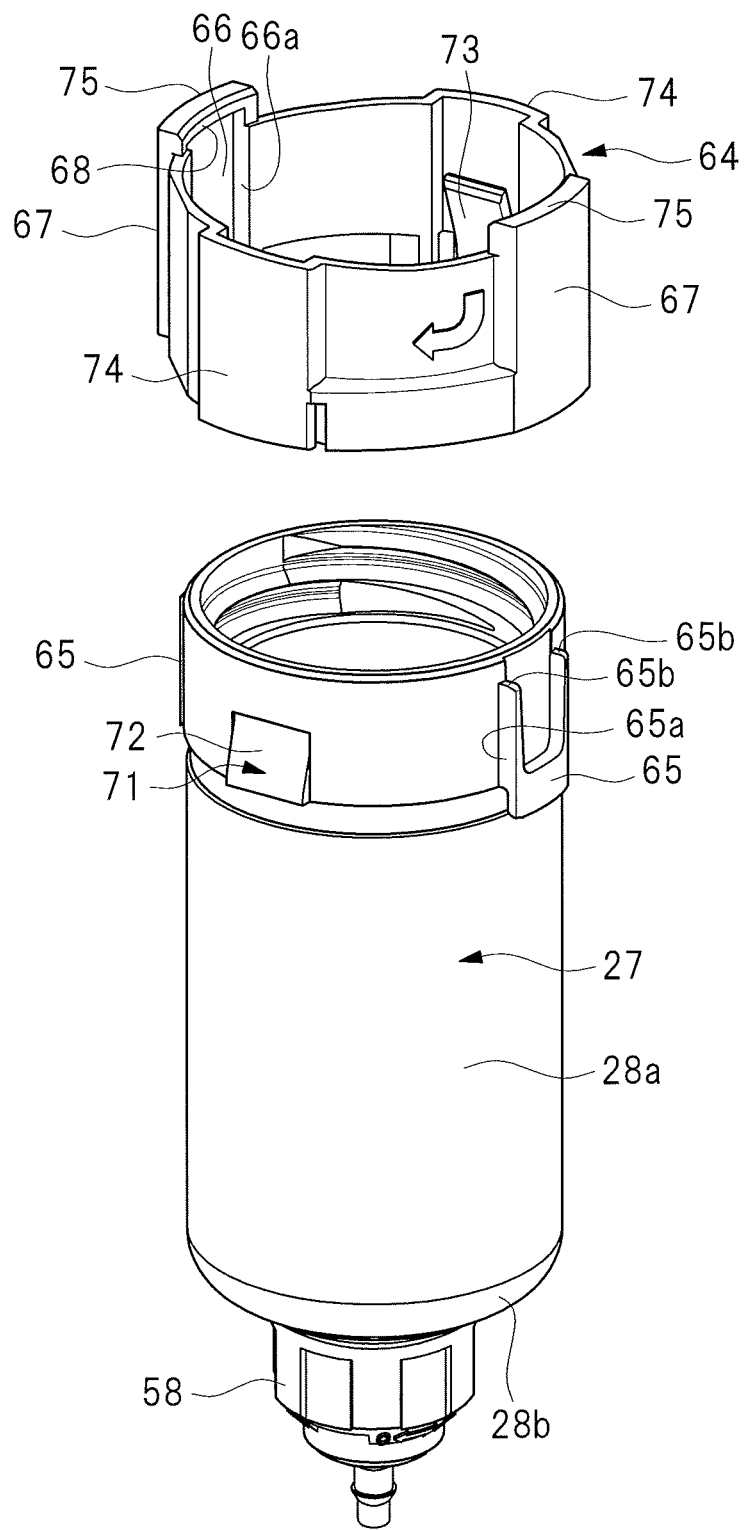
FIG. 12 is an exploded perspective view showing a collection container and an annular lock member.

FIG. 12 is an exploded perspective view of the collection container 27 and the annular lock member 64, where two convex guide portions 65 are provided on an outer peripheral surface of the collection container 27 so as to be shifted from each other by an angle of 180° in a circumferential direction, and a concave guide portion 66 in which the convex guide portion 65 is received are formed on an inner peripheral surface of the annular lock member 64, as shown in FIG. 12. Therefore, the annular lock member 64 is moved in the axial direction outside the collection container 27 while being guided by the convex guide portions 65 entering the concave guide portions 66. Outer surfaces of portions of the annular lock member 64 corresponding to the concave guide portions 66 are formed as projecting portions 67 projecting radially outward in order to make a wall thickness of resin even. A side wall 66a of the concave guide portion 66 comes in contact with a side surface 65a of the convex guide portion 65, so that rotation of the annular lock member 64 is prevented by both the guide portions 65 and 66. Outer surfaces of portions of the annular lock member 64 corresponding to the concave guide portions 66 are formed as projecting portions 67 projecting radially outward in order to make a wall thickness of resin even. A stopper 68 on which an end portion 65b of the convex guide portion 65 abuts is provided on the concave guide portion 66, and the stopper 68 abuts on the end portion 65b of the guide portion 65 so that the position of the annular lock member 64 in a direction toward the bottom wall portion 28b of the collection container 27 is restricted.

Two inclination projections 71 are provided on an outer peripheral surface of the collection container 27 so as to be shifted from the convex guide portion 65 by an angle of 90 degrees in a circumferential direction. The inclination projection 71 has an inclination surface 72 inclined radially outward toward the bottom portion of the collection container 27. On the other hand, tongue pieces 73, each inclining upward and radially inward and contacting with the inclination surface 72, are provided on an inner peripheral surface of the annular lock member 64 so as to project inward of the annular lock member 64. A portion of the annular lock member 64 which is provided with the tongue piece 73 is recessed, and an outer surface of a portion of the annular lock member 64 corresponding to the recessed portion is formed as a projecting portion 74.

The tongue piece 73 is made of elastically-deformable resin material and is formed integrally with the annular lock member 64, and a distal end side thereof is elastically deformed so as to displace in a radial direction. The tongue piece 73 is formed so that its distal end, namely, an inclination distal end is inclined radially inward. Since the annular lock member 64 integrated with the tongue pieces 73 is molded by elastically-deformable resin, an inclination distal end of the tongue piece 73 can be deformed by a radially outward force. Therefore, when the annular lock member 64 is moved in the longitudinal direction toward the bottom portion of the collection container 27, the distal end side of the tongue piece 73 is elastically deformed so as to slide along the inclination surface 72 to displace radially outward. A pressing force toward an opening end portion of the collection container 27 is biased to the annular lock member 64 by repulsive force of the elastically deformed tongue piece 73. Therefore, when the annular lock member 64 is released from a hand of an operator under such a state that the annular lock member 64 has been moved manually toward the bottom portion of the collection container 27 to a lock release position, the annular lock member 64 is automatically returned to its original position by the pressing force. Thus, a pressing member which presses the annular lock member 64 toward the port block 13 is formed of the inclination projection 71 having the inclination surface 72 and the tongue piece 73.

The projecting portion 67 including the concave guide portion 66 on the inner surface thereof protrudes beyond an end surface of the annular lock member 64 axially outward toward the port block 13, and a protruding end portion of the projecting portion 67 constitutes a movable side engagement portion 75. On the other hand, a flange 76 provided on the separation cylinder 20 is formed with a notched portion engaged with the movable side engagement portion 75, and the notched portion constitutes a fixation side engagement portion 77. As shown in FIG. 9, a lower surface of the flange 76 constitutes an end surface 78 on which the annular lock member 64 is caused to abut, and the fixation side engagement portion 77 is formed with a stopper surface 77a. On the other hand, a side surface of the movable side engagement portion 75 constitutes a stopper surface 75a opposed to the stopper surface 77a.

The annular lock member 63 also has the same shape as the annular lock member 64, and a guide portion similar to the convex guide portion 65 shown in FIG. 12 is provided on an outer peripheral surface of the cylindrical portion 21 of the separation cylinder 20 and an inclination projection 71 similar to the inclination projection 71 is provided thereon. A movable side engagement portion similar to the movable side engagement portion 75 of the annular lock member 63 is also provided on the annular lock member 63, and the movable side engagement portion is engaged with a fixation side engagement portion provided on the port block 13.

Figure 13:
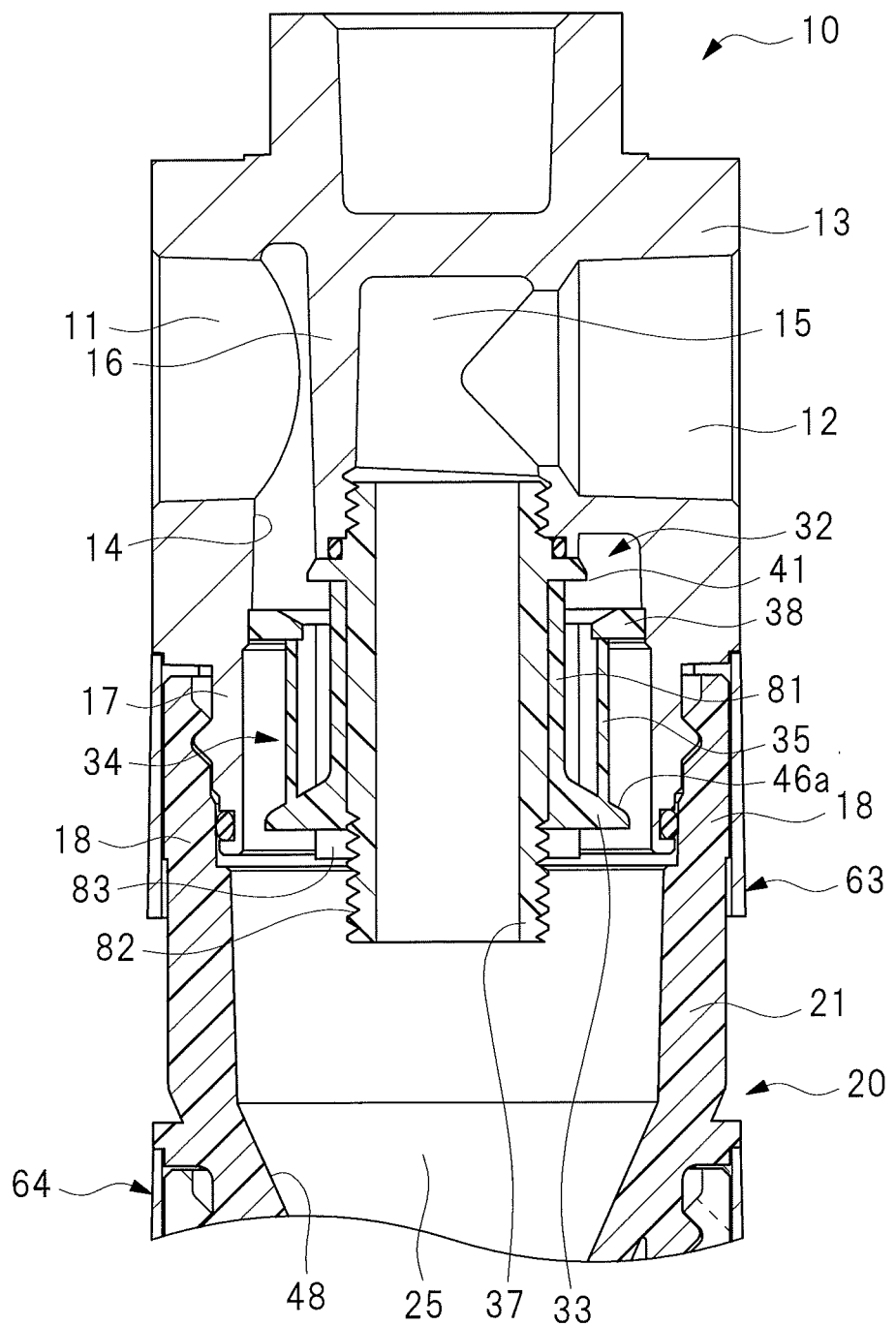
FIG. 13 is a cross sectional view showing the upper half of a filter apparatus according to another embodiment of the present invention.
Figure 14:
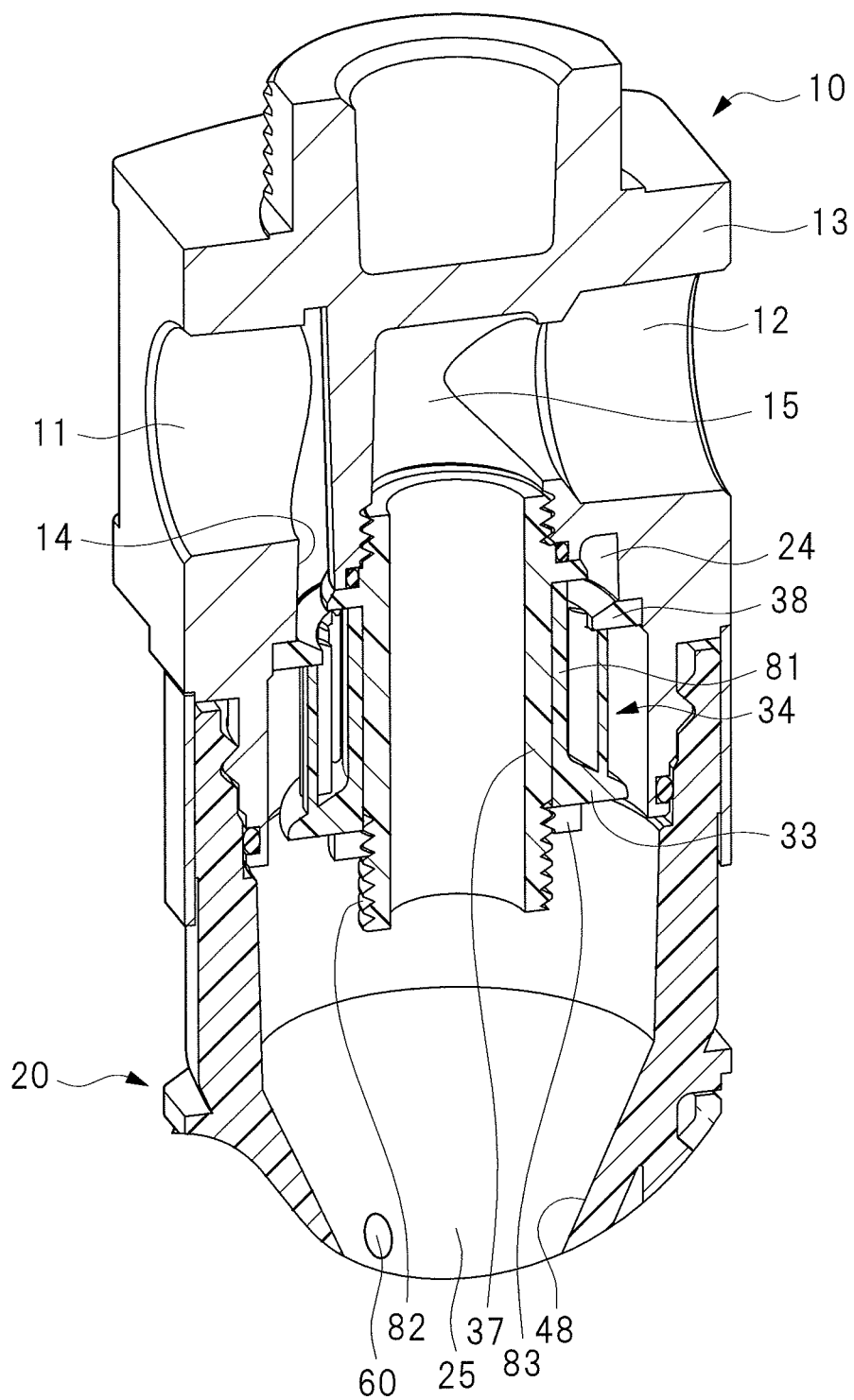
FIG. 14 is a perspective view of FIG. 13.
Figure 15:
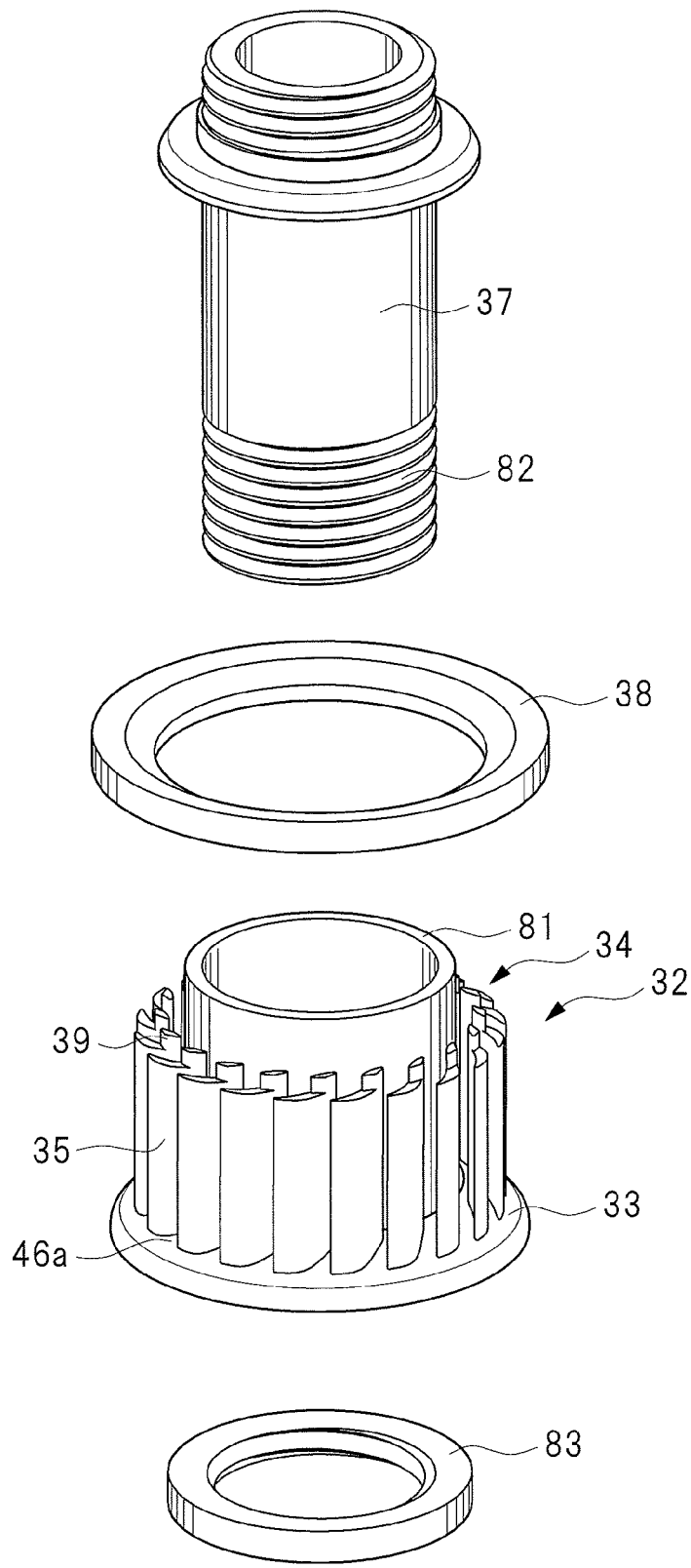
FIG. 15 is an exploded perspective view showing a swirl flow generator shown in FIGS. 12 and 13.

FIG. 13 is a cross sectional view showing the upper half of a separation apparatus according to another embodiment of the present invention, FIG. 14 is a perspective view of FIG. 13, and FIG. 15 is an exploded perspective view showing a swirl flow generator shown in FIGS. 13 and 14.

The swirl flow generator 32 shown in FIGS. 13 to 15 is configured to jet air radially outward direction regarding the cylindrical blade portion 34 to generate swirl flow, which is different from the filter 10 shown in FIG. 1 which is configured so as to jet air radially inward regarding the cylindrical blade portion 34 to generate swirl flow.

As shown in the figures, a cylindrical sleeve 81 is provided integrally with the annular base portion 33 of the swirl flow generator 32, and the sleeve 81 is fitted and fixed to the outside of the exhaust pipe 37. The annular base portion 33 is fixed to the exhaust pipe 37 by a nut 83 screwed to a male screw 82 formed on the exhaust pipe 37. The annular base portion 33 is integrated with the cylindrical blade portion 34, and the cylindrical blade portion 34 is composed of a plurality of blades 35 extending along the sleeve 81 outside thereof in an axial direction.

In order to supply air flowing from the primary port 11 in the receiving hole 14 from an upper end of the cylindrical blade portion 34 along the sleeve 81 in the axial direction, an annular closing lid portion 38 is arranged inside the receiving hole 14 and a lower surface of the closing lid portion 38 positioned on an inner peripheral side is caused to abut on an outer peripheral portion of an upper end of the cylindrical blade portion 34. Notched portions 39 on which the closing lid portion 38 abuts are formed on an outer peripheral portion of an upper end of the cylindrical blade portion 34.

A liquid droplet guiding surface 46a downward-inclined from a lower end portion of the sleeve 81 radially outward is formed on the annular base portion 33, so that liquid droplets in air are guided by the blades 35 to reach the lower end portion of the cylindrical blade portion 34 and flow along the inclined liquid droplet guiding surface 46a to drop in the separation chamber 25. Since the dropping position is away from the exhaust pipe 37, liquid droplets are prevented from entering the exhaust pipe 37. In addition, since the inside of the cylindrical portion 21 is formed as a diameter-enlarged portion set so that the inner diameter of the cylindrical portion 21 is larger than the inner diameter of the swirl flow generating portion inside the male screw portion 17 and the lower end portion of the exhaust pipe 37 is positioned in the diameter-enlarged portion, liquid droplets can be prevented from entering the exhaust pipe 37.

Also, in the filter 10 of the aspect shown in FIGS. 13 to 15, as shown in FIG. 14, the conical surface 48 is formed with a through hole 60 through which the separation chamber 25 communicates with the storage chamber.

Thus, as the cylindrical blade portion 34, there are two aspects, that is, the first aspect where air flowing in the axial direction is swirled while being caused to flow radially inward, and the second aspect where the air is swirled while being caused to flow radially outward.

Figure 16A:
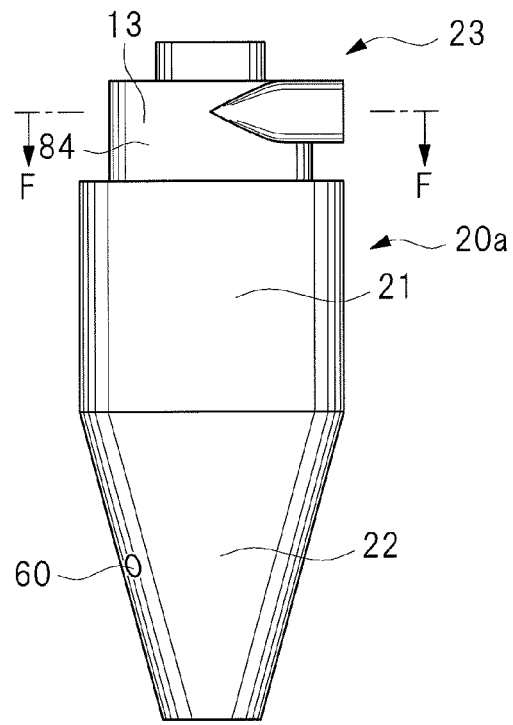
FIG. 16A is a front view showing a separation unit of a filter apparatus according to another embodiment of the present invention.
Figure 16B:
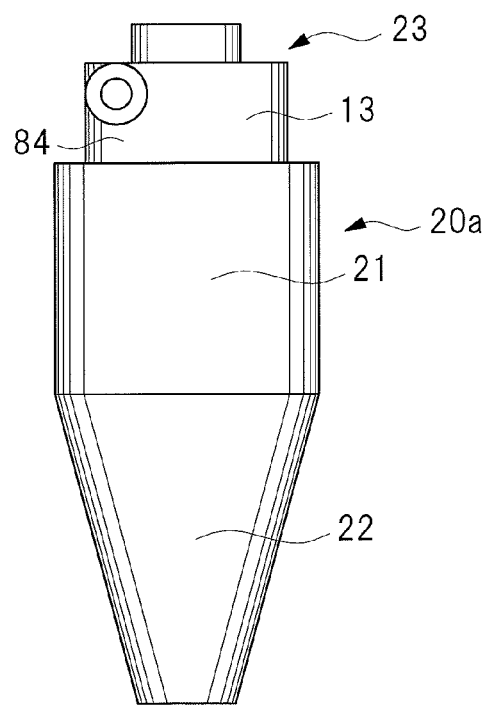
FIG. 16B is a right side view of FIG. 16A.
Figure 17:
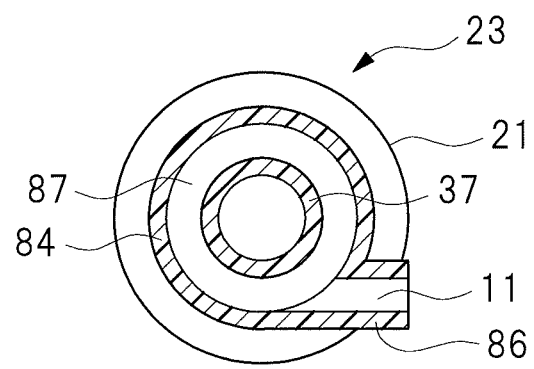
FIG. 17 is a cross sectional view taken along the line F-F in FIG. 16A.
Figure 18:
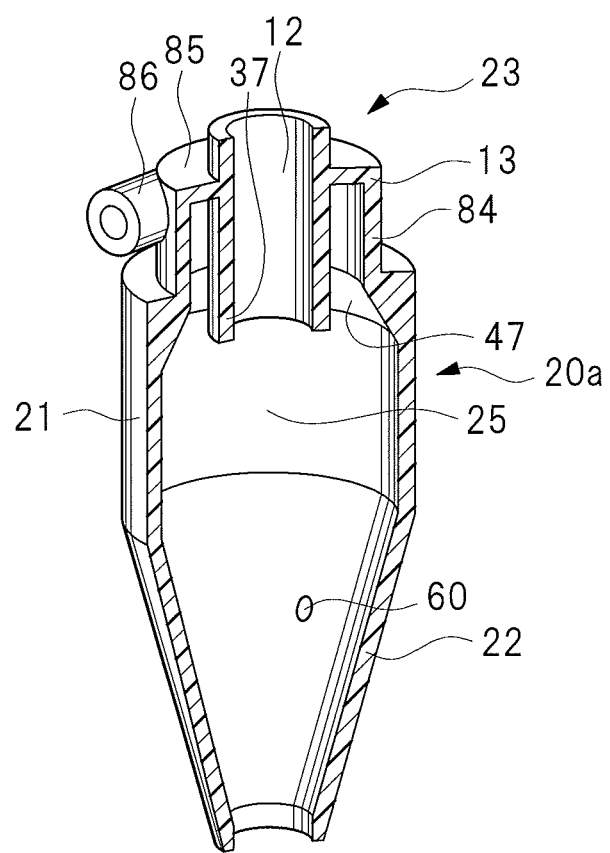
FIG. 18 is a cross sectional view of the separation unit shown in FIGS. 16A and 16B.

FIGS. 16 to 18 show a separation unit of a filter according to another embodiment of the present invention. The separation unit 23 of the filter includes a separation cylinder 20a provided with the cylindrical portion 21 and the conical portion 22 integrated therewith on a lower side of the cylindrical portion 21. The port block 13 provided in the separation cylinder 20a has a swirl flow generating portion 84 composed of a cylindrical portion having a diameter smaller than that of the cylindrical portion 21, and an upper end thereof is provided with an end wall portion 85. The swirl flow generating portion 84 is provided with an air introducing pipe 86 formed with a primary port 11. As shown in FIG. 17, the air introducing pipe 86 is provided so that the primary port 11 communicates with the swirl flow generating portion 84 along an inner peripheral surface thereof in a tangential direction.

The exhaust pipe 37 is provided on the end wall portion 85 of the port block 13 at a central position of the separation cylinder 20a so as to face an axial direction. An upper end portion of the exhaust pipe 37 constitutes a secondary port 12 through which purified air flows outside. As shown in FIG. 17, a space between an inner peripheral surface of the swirl flow generating portion 84 and an outer peripheral surface of the exhaust pipe 37 constitutes a swirl flow generating chamber 87, and air flowed from the primary port 11 into the swirl flow generating chamber 87 in the tangential direction flows along an inner peripheral surface of the swirl flow generating portion 84 so that swirl flow is produced in the swirl flow generating chamber 87.

The taper surface 47 is provided, as a diameter-enlarged portion, on a radial outside of the lower end portion of the exhaust pipe 37 to be positioned at an upper end portion of the cylindrical portion 21. When the diameter-enlarged portion is provided at the upper end portion of the cylindrical portion 21 of the separation unit 23 in this manner, liquid droplets which flow from the swirl flow generating portion 84 in the separation chamber 25 together with the swirl flow can be prevented from entering the exhaust pipe 37.

Figure 19:
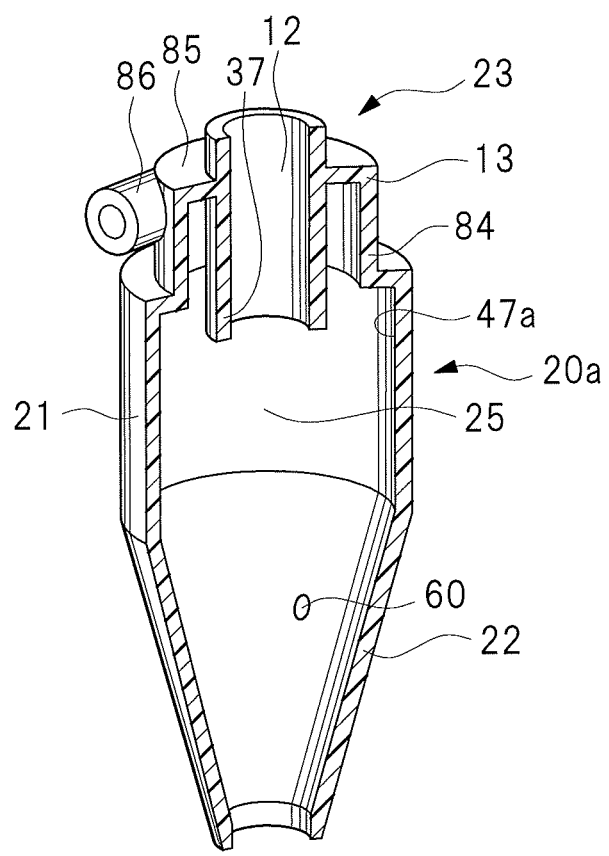
FIG. 19 is a cross sectional view showing a modified embodiment of the separation unit shown in FIGS. 16A to 18.

FIG. 19 shows a modified embodiment of the separation cylinder 20*a*. An inner peripheral surface of the cylindrical portion 21 of the separation cylinder 20*a* shown in FIG. 19 has a fixed inner diameter wholly, and an upper end portion of the inner peripheral surface is configured as a diameter-enlarged portion 47*a* having an inner diameter larger than the inner diameter of the swirl flow generating portion 84. Thus, since the diameter-enlarged portion 47*a* has a straight inner diameter, separated liquid droplets are prevented from being ingested and introduced into the exhaust pipe 37.

The separation cylinder 20*a* shown in FIGS. 16 to 19 is configured to be attached with the above-described collection container 27, and separated liquid droplets are stored in the collection container 27 as well as the above-described filter.

Also, a conical portion of each filter of embodiments shown in FIGS. 14A and 16 is formed with a communication hole 60, and a conical portion of a filter of an embodiment shown in FIG. 19 is formed with a communication hole 60. Since the separation chamber separation communicates with a storage chamber 30 (not shown) via a communication hole 60, it is possible to prevent collected liquid from forming a bridge at the exhaust port 31.

Thus, as the swirl flow generating portion which converts air supplied from the primary port into swirl flow, there are two aspects. In one aspect, air flowing in the radial direction is swirled in a circumferential direction using the cylindrical blade portion 34. In the other aspect, swirl flow is produced by supplying air from the primary port toward the inner peripheral surface of the swirl flow generating portion in the tangential direction. In each aspect, since the conical portion 22 is formed with a communication hole 60, the filter can be enhanced in foreign matter removal efficiency.

The present invention is not limited to the above-described embodiments and may be modified variously without departing from the gist of the present invention. For example, though a manual drain mechanism is provided in the collection container 27 in order to exhaust liquid recovered in the collection container 27 outside, an automatic drain mechanism or a semi-automatic drain mechanism may be provided in the collection container.

What is claimed is:

1. A filter for separating foreign matter from air, comprising:
a separation unit having a port block and a separation cylinder which is attached to the port block, the port block having a primary port to which the air is supplied, the separation unit being formed with a swirl flow generating portion which changes the air supplied from the primary port into swirl flow, and a separation chamber communicating with the swirl flow generating portion, wherein the port block further has a secondary port which causes purified air obtained by separation of foreign matter in the separation chamber to flow out, and an exhaust port is formed at a lower end portion of the separation unit;
a collection container attached to the separation unit, the collection container having a storage chamber in which foreign matter exhausted from the exhaust port of the separation unit is stored;
an exhaust pipe arranged at a central portion of the swirl flow generating portion to guide purified air to the secondary port; and
a lock member attached to the outside of the separation cylinder, wherein the lock member has a first state to prevent the separation cylinder from being detached from the port block, and a second state to allow the separation cylinder to be detached from the port block.
wherein the separation unit has a conical portion formed with a conical surface reduced in diameter toward the exhaust port,
wherein the conical portion is formed with a communication hole through which the separation chamber and the storage chamber communicate with each other,
wherein the communication hole is above the exhaust port.

2. The filter according to claim 1, wherein, in a case where a position of the primary port is defined as an angle of 0 degree, the communication hole is formed within a range between 270 and 90 degrees in angle defined with respect to a center axis of the primary port.

3. The filter according to claim 1, wherein the communication hole is formed within a range between 0 and 90 degrees in angle defined with respect to a center axis of the primary port.

4. The filter according to claim 3, wherein the communication hole is formed at a position defined as an angle of 45 degrees in a swirling direction.

5. The filter according to claim 1, wherein an inclination angle of the conical surface with respect to a center axis of the separation unit is within a range between 20 and 30 degrees, and an inner diameter of the exhaust port is within a range between 6.5 and 10.5 mm.

6. The filter according to claim 2, wherein an inclination angle of the conical surface with respect to a center axis of the separation unit is within a range between 20 and 30 degrees, and an inner diameter of the exhaust port is within a range between 6.5 and 10.5 mm.

7. The filter according to claim 3, wherein an inclination angle of the conical surface with respect to a center axis of the separation unit is within a range between 20 and 30 degrees, and an inner diameter of the exhaust port is within a range between 6.5 and 10.5 mm.

8. The filter according to claim 4, wherein an inclination angle of the conical surface with respect to a center axis of the separation unit is within a range between 20 and 30 degrees, and an inner diameter of the exhaust port is within a range between 6.5 and 10.5 mm.

* * * * *